Figure 1:
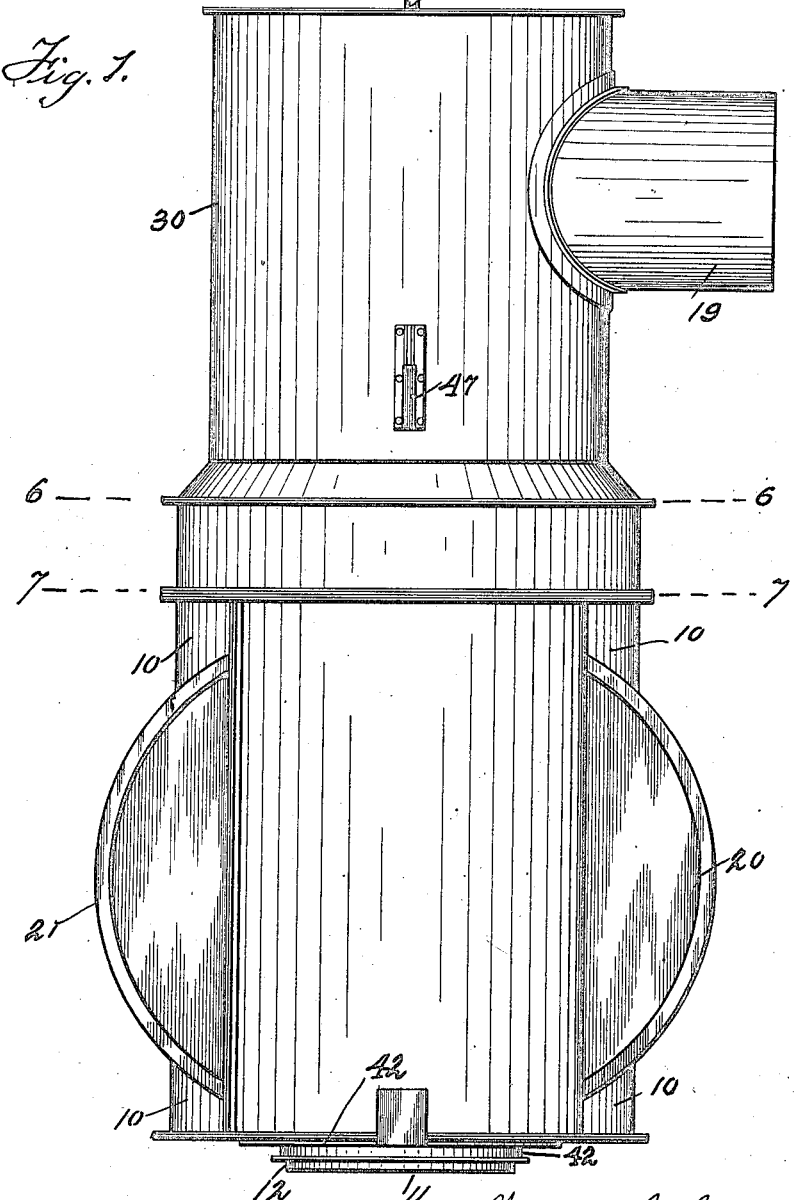

May 29, 1923.

W. G. GRIFFIN

FUEL ECONOMIZER

Filed June 12, 1922

1,456,691

5 Sheets-Sheet 2

William G. Griffin
INVENTOR.

BY Hugh M. Sterling
ATTORNEY.

May 29, 1923.

W. G. GRIFFIN

FUEL ECONOMIZER

Filed June 12, 1922

1,456,691

5 Sheets-Sheet 4

William G. Griffin
INVENTOR.

BY Hugh M. Sterling
ATTORNEY.

May 29, 1923.

W. G. GRIFFIN

FUEL ECONOMIZER

Filed June 12, 1922

1,456,691

5 Sheets-Sheet 5

William G. Griffin
INVENTOR.

BY Hugh M. Sterling
ATTORNEY.

Patented May 29, 1923.

1,456,691

UNITED STATES PATENT OFFICE.

WILLIAM G. GRIFFIN, OF WASHINGTON, DISTRICT OF COLUMBIA.

FUEL ECONOMIZER.

Application filed June 12, 1922. Serial No. 567,646.

*To all whom it may concern:*

Be it known that I, WILLIAM G. GRIFFIN, a citizen of the United States, residing at Washington, in the District of Columbia, have invented certain new and useful Improvements in Fuel Economizers, of which the following is a specification.

The invention has particular relation to that class of devices which seeks to aid combustion by introducing air into the exhaust conduit of furnaces and the like, in opposition to the outward draft and causing the return of products of combustion mixed with the air to the fire chamber where they are consumed.

The present invention has for its object to make the introduction of air and its mixing with the exiting products of combustion more effectual as well as to increase the amount of the mixture that may be delivered through the exhaust conduit to the fire chamber for consumption and thus very materially increase the saving of the unburnt products of combustion and eliminate the emission of smoke from the stack. To this end the invention consists in providing the exhaust conduit of a furnace with an expansion chamber into which the exiting gases and products are allowed to expand and be retarded and into which the products of combustion are delivered preferably through a divided passage and at opposite sides of the expansion chamber, and in combining with the structure so provided an air intake and mixing nozzle extending within the expansion chamber and having its discharge opening within the exhaust conduit in opposition to the direction of the draft and at a point where the division of the draft takes place, whereby an in-going draft to the fire chamber is the more readily established that will deliver its mixture therein for consumption.

The invention further consists in providing as a part of the exhaust conduit of a furnace a chamber in which are disposed inductors for the products of combustion, one within the other, and designed to provide a passage between them for the out-going products of combustion, and associated with means for introducing air to provide an inward draft within the inner inductor and along the outer walls of the outer inductor, the whole being arranged to deliver the mixture of air and the induced products of combustion within the exhaust conduit and preferably centrally thereof.

The invention also consists in certain other novel features in the arrangement and construction of parts, all as hereinafter described, and as specifically set forth in the appended claims.

Figure 2:
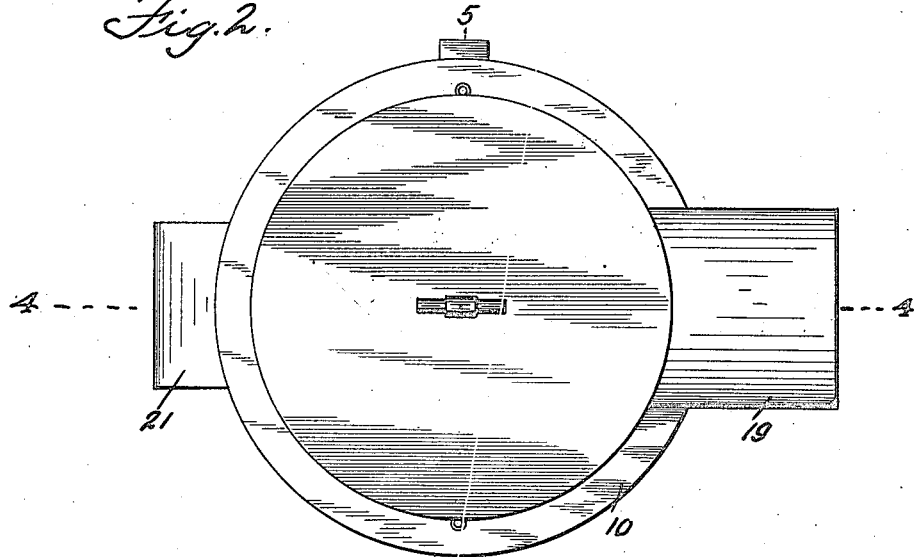
Figure 3:
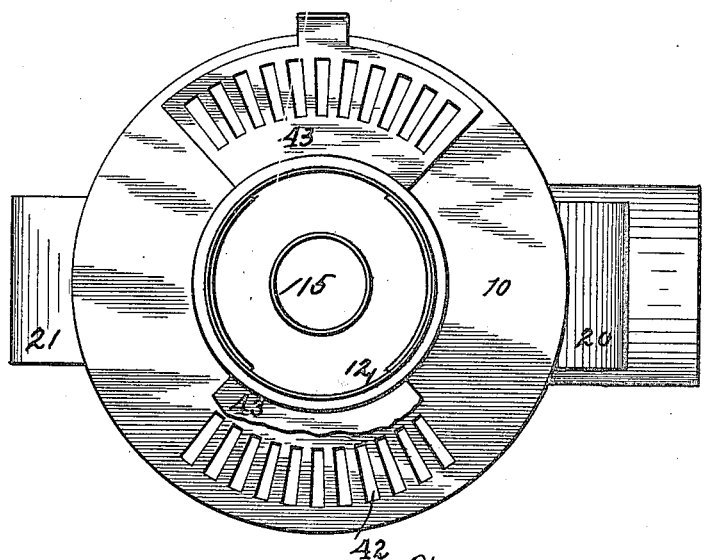
Figure 4:
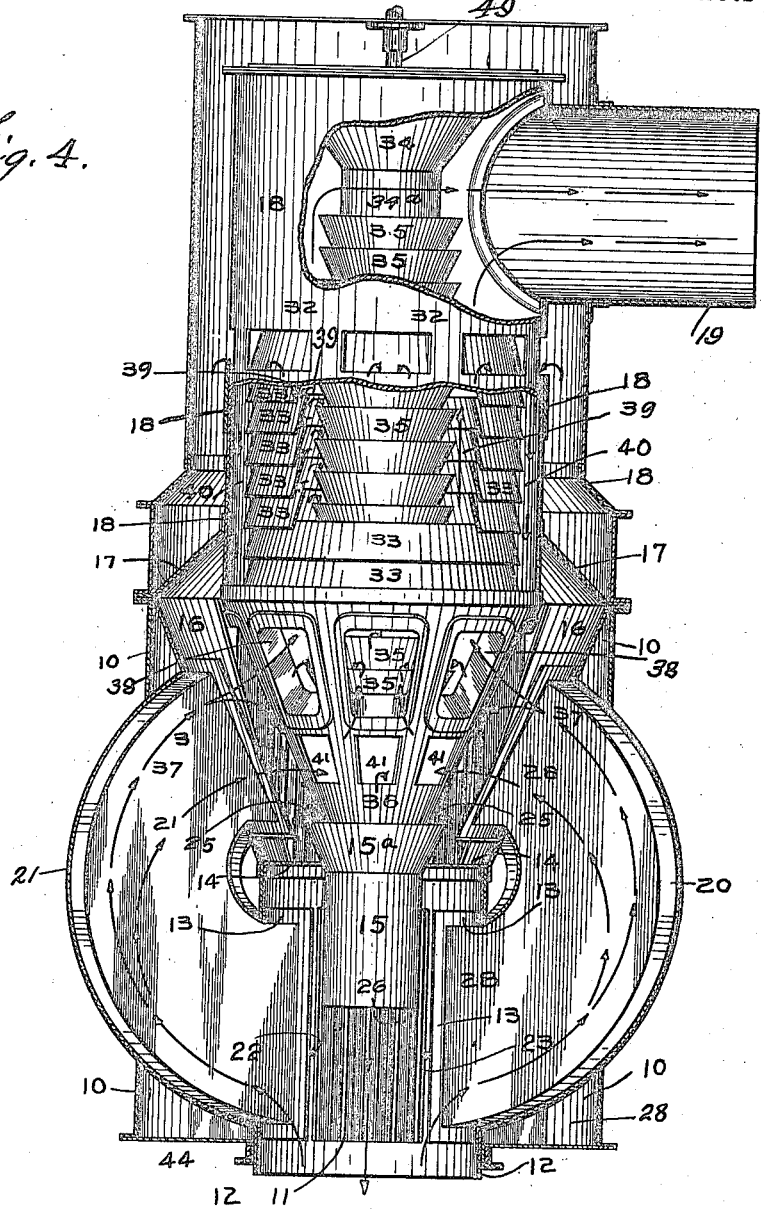
Figure 5:
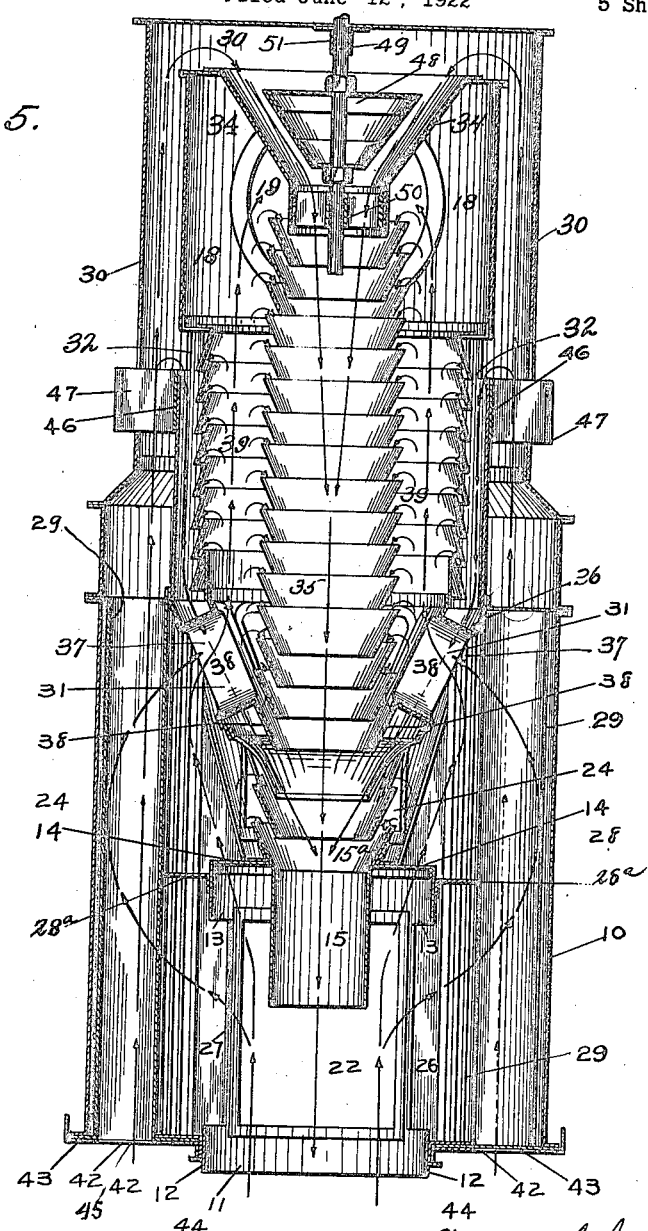
Figure 6:
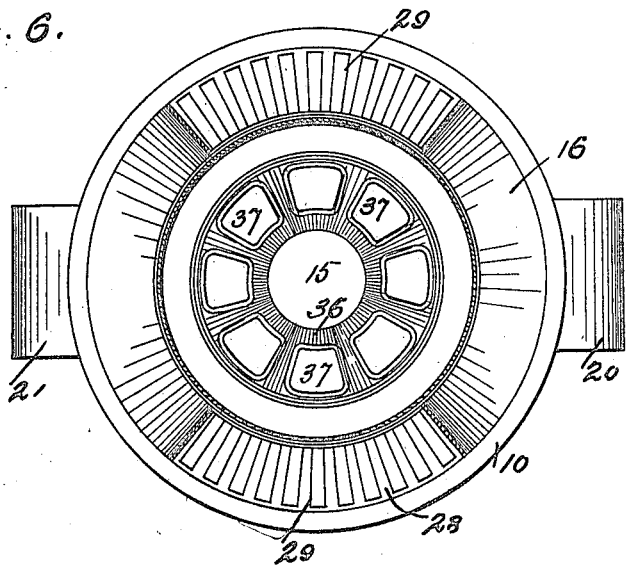

In the accompanying drawings,

Figure 1, is a view in elevation of an embodiment of the invention;

Figure 2, a top or plan view;

Figure 3, an inverted plan or bottom view;

Figure 4, a vertical cross section taken on the line 4—4 of Figure 2;

Figure 5, a vertical cross section taken on the line 5—5 of Figure 2;

Figure 6, a horizontal cross section taken on the line 6—6 of Figure 1; and

Figure 7:
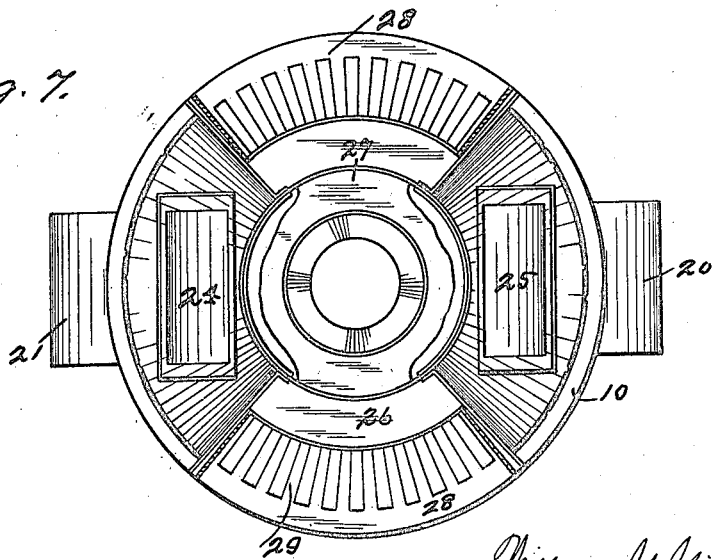

Figure 7, a horizontal cross section taken on the line 7—7 of Figure 1, with the conical inducting portion removed to better disclose the interior.

Referring to the drawings, the device as shown is of sheet metal construction and 10 indicates the lower drum portion thereof which is provided with the bottom opening 11 surrounded by the annular flange 12, into which opening is fitted the end of the exhaust conduit leading directly from the furnace. Extending upward into the drum 10 is a continuation 13 of the exhaust conduit that is closed at its top by the cap plate 14 except for a nozzle end section 15 supported on the cap plate and extending through the same into the said continuation of the exhaust conduit for the purpose of directing into the conduit and through it to the fire chamber of those products of combustion that have been mixed with air in a manner that will hereinafter appear.

Within the drum 10 and extending from the top edge thereof to the top edge of the conduit continuation 13 is an interior chamber 16 of truncated conical form that is closed at its contracted end by the top plate 14 but in open relation with the conduit 13 through the nozzle end section 15. At its point of greatest flare the chamber 16 is supplied with a reversely flared extension formed by the annular flared plate 17, and receives within the central opening in the plate a drum 18 of larger size than the exhaust conduit 13 but which together with the conical chamber 16 forms the passage through which the exiting products of combustion pass to the exhaust outlet 19 which forms the connection with that portion of the exhaust conduit terminating in the stack or chimney. By virtue of the size of the chamber 16 and the drum chamber 18 it is possible to provide therein the form of nozzle structure shown for introducing air, mixing the air with the products of combustion and re-introducing with nozzle effect those products of combustion with its admixture of air into the fire chamber without choking the draft.

The communication between the continuation 13 of the exhaust conduit and the chamber 16, except for the opening of the nozzle section therein, is mainly through the two outwardly curving ducts 20 and 21 extending from opposite side openings 22 and 23 respectively in the walls of the continuation 13 to openings 24 and 25, respectively in the walls of the conical chamber 16, thus forming a divided passage way for the outgoing draft that splits and directs outwardly the draft, directing it away from the mouth of the nozzle section 15 to permit the induced return current of the nozzle to enter with greater facility the exhaust conduit to the fire chamber of the furnace and cause the discharge of the outgoing products of combustion into the chamber 16 and in the rear of the said nozzle section so that the nozzle section will act in opposition to the draft. This draft is in a manner aided by the action of the nozzle as its flared suction end 15$^a$ draws upon the surrounding gases. The products of combustion discharged through ducts 20 and 21 into the chamber 16 are permitted to expand therein with consequent lessening of current outwardly and the formation about the inner end 15$^a$ of the nozzle section pockets of relatively quiet gas that by reason of its pocketed condition is the more readily drawn into the nozzle.

Diagonally to the openings 22 and 23 there are formed in opposite walls of the exhaust continuation 13 openings 26 and 27 through which some of the products of combustion may pass into the chamber 16 and thence to the drum 18, but only after entering a surrounding chamber 28 to provide a heating space therein through which there extends on each side between the ducts 20 and 21 a series of flat metal pipes 29 which open through the bottom of the drum 10 and at their other ends are in open relation to an upper drum or jacketed space 30. By means of the baffle plate 28$^a$, the hot gases and other products of combustion are caused to pass through the spaces between the ducts and return again at a higher altitude and pass into the chamber 16 through opening 31, as indicated by the arrows. By this disposition of the air ducts within the path of the hot products of combustion heated air of high temperature is introduced into the jacketed space surrounding the drum 18, that will enter that drum at very high temperature so that it is capable of thoroughly mixing with the products of combustion, the heated air entering the drum 18 through the end of a centrally located gas induction section 34$^a$ comprising a part of the nozzle structure wherein are drawn the products of combustion to mix with the air and be discharged into the conduit, while through the openings 32 the highly heated air passes downwardly between the interior walls of the drum 18 and a series of superposed, overlapping spaced bands 33 having inward and upward inclination which being in the path of the products of combustion tend to arrest them and deflect them outward and downward through the spaces between the bands to mix with the heated air and superinduce the inward current of air along the walls of the drum 18, it being the object of the dual arrangement of inductors that while the nozzle mixing structure operates on the inside of a hollow column of the exiting gases the outer series of inductors will operate on the exterior of this hollow column, and thus subject the exiting gases to a thorough commingling of heated air. The central and main series of inductors receive the heated air in the funnel section 34 which forms a closure to the top of drum 18 and directs the heated air to the nozzle section 15, through the agency of the intermediate series of overlapped, spaced inductor bands 35 which have inwardly converging walls that tend to deflect the outward bound products of combustion inward and downward through the spaces between the bands, the same becoming mixed with the central current of heated air passing through the nozzle formed by the inductor bands to the discharge section 15. Further by the association together of the centrally arranged series of bands 35 and the surrounding series of bands 33 a path is created between the two series for the outward bound products of combustion which is a succession of converging passages that, as they tend to arrest the current provide a succession of expansions and contraction thereof and to cause the passage downward of a large part thereof with its admixture of heated air at a point in the exhaust conduit where the pressure of the exiting gases is greatest and heretofore less accessible of mixing with the air.

In order to unite the outer current of mixed air and gas with that passing through the central inducing nozzle, a funnel 36 is provided that extends from the drum 18 and form a converging extension of the drum, the smaller end of the extension entering and being in spaced relation with, the flared portion 15$^a$ of the nozzle section 15.

While the funnel 36 is provided with openings 37 for the passage of the outward bound gases and other products of combustion these openings are surrounded with inwardly extending flanges 38, that form nipples to said openings and which causes the current of the products of combustion to be well introduced before continuing outward in the passage 39 between the two series of deflecting and inducting bands 33 and 35, and the inward bound current of heated air mixed with the products of combustion in the space 40 between the wall of the drum 18 and the bands 33 will follow the walls of the funnel 36 and not be repulsed by the incoming draft.

A lower series of openings 41 are formed in the funnel 36 to receive a part of the products of combustion as the location of the openings is such as to permit the said products about the opening to enter the nozzle and be drawn therein, mixed with air and carried into the fire chamber in the same manner as the pocketed gases are drawn in from the chamber 16 between the small end of the funnel 36 and the flared portion 15$^a$ of the nozzle.

For the control of the air intake openings 42, there is provided a shutter plate 43 extending from a band 44 and on opposite sides of the conduit and rotatable on the collar or flange 12, each shutter having openings 45 to register with the air intake openings as is usual in shutter devices of this type.

The openings 32 for the inward bound outer current of air along the sides of the drum 18 are also capable of size variation by means of a slidable collar 46 which may be raised or lowered by the operating extension 47 protruding through the drum walls, while the central current of inward bound air is subject to regulation by the conical means 48 disposed in spaced relation within the funnel intake, and which means 48 is varied in its spaced relation by raising and lowering the regulating stem 49 upon which it is mounted, the stem being slidably held in a bearing 50 provided in the funnel intake and a bearing 51 in the air drum.

From the foregoing it will be seen that a structure is provided that permits the expansion and delay of the products of combustion within the exhaust conduit of a furnace, where they are effectively drawn into and thoroughly mixed with highly heated air and directed with nozzle effect into the exhaust conduit at a point beyond the point of the discharge of the said products into the expansion chamber of the device. As a result the highly heated air is further heated in mixing with the hot gases and reaches the ignition point as it is delivered to the fire chamber. By reason of the provision for deflecting the products of combustion outwardly as by the passages 20 and 21 and at the point where the nozzle end is introduced into the exhaust conduit, the obstructing force of the draft is dissipated and where the pressure of the gas is the least and the opposition or return current the more readily established and the mixture brought nearer the point of consumption.

By virtue of the highly heating of the air and its introduction inward along the walls of the drum 18 and also within the centrally disposed mixing and inducting nozzle structure, the outward bound products of combustion is brought between these two inward bound currents which, through the spaces of the deflecting and arresting bands 33 and 35, draw upon this column of products of combustion both on the interior and exterior thereof, the column taking a hollow form, while from the approximate currentless and relative quiet accumulation of gases in the chamber 16 due to expansion and pocketing thereof, the nozzle action is permitted to induce much of the gases to enter the nozzle and be returned to the fire chamber vitalized for combustion by the necessary component of heated air.

What I claim is:

1. A combustion device comprising a chamber forming an enlarged interposed portion of the exhaust conduit of a furnace, and a mixing nozzle within said chamber having an air inlet and having its discharge end within the exhaust conduit at a point in advance of the discharge of the products of combustion within said chamber, said nozzle having passages communicating with the interior of said chamber for the induction into the nozzle of the products of combustion.

2. A combustion device comprising a chamber forming an enlarged interposed portion of the exhaust conduit of a furnace, a mixing nozzle within said chamber having an air inlet, inductor passages for the products of combustion, and having the discharge end of the nozzle extending into the exhaust conduit, means for conducting the exiting products of combustion outwardly from the vicinity of the discharge end of the nozzle and into said chamber.

3. A combustion device comprising a mixing nozzle disposed within the exhaust conduit of a furnace, having an air inlet, induction passages for the products of combustion, and a discharge end for the delivery of the mixture of air and products of combustion in a direction opposite to that of the outgoing draft of the conduit, and a passageway connecting at one end with the conduit at the discharge end of the nozzle and at its other end with the conduit at a point beyond the end of the nozzle in the direction of the outwardly bound products of combustion.

4. A combustion device comprising a mixing nozzle disposed within the exhaust conduit of a furnace, having an air inlet, inductor passages for the products of combustion, and a discharge end for the delivery of the mixture of air and products of combustion in an opposite direction to the exiting draft of the conduit, said conduit having openings in the sides thereof and adjacent the point of discharge from the nozzle, and by-pass ducts connecting said openings with the conduit and in the rear of the discharge end of the nozzle.

5. A combustion device comprising a mixing nozzle disposed within the exhaust conduit of a furnace, having an air inlet, inductor passages for the products of combustion, and a discharge end for the delivery of the mixture of air and products of combustion in an opposite direction to the exiting draft of the conduit, a chamber surrounding the exhaust conduit and forming a passage for the products of combustion from the point of discharge of the nozzle to the rear thereof, and a series of air ducts arranged within said passageway and in the path of the exiting products of combustion, said ducts being in open relation to the outer air at one end and in communication with the nozzle at its inlet end.

6. A combustion device comprising a mixing nozzle disposed within the exhaust conduit of a furnace, having an air inlet, inductor passages for the products of combustion, and a discharge end for the delivery of the mixture of air and products of combustion in an opposite direction to the exiting draft of the conduit, said conduit having openings in the sides thereof adjacent the point of discharge from the nozzle, by-pass ducts connecting opposite openings directly with the conduit in the rear of the discharge end of the nozzle, a chamber exterior to the conduit and forming a passage for a part of the products of combustion to the rear of the point of discharge of the nozzle, and air ducts disposed within said exterior chamber and in the path of the said products and in communication with the air inlet of the nozzle, whereby the air is heated before delivery to the nozzle.

7. A combustion device comprising a mixing nozzle disposed within the exhaust conduit of a furnace in opposition to the exiting products of combustion and having an air inlet, and inductor passages for the products of combustion, means surrounding said nozzle and in spaced relation to the walls of the conduit for deflecting the products of combustion outward and downward adjacent said walls, and means for introducing air into the conduit adjacent the walls thereof to mix with the downwardly deflected products.

8. A combustion device comprising a mixing nozzle disposed within the exhaust conduit of a furnace in opposition to the exiting products of combustion and having an air inlet and inductor passages for the products of combustion to form a mixture thereof with the admitted air, means surrounding said nozzle and in spaced relation to the walls of the conduit for deflecting the products of combustion outward and downward adjacent the said walls, means for introducing air into the conduit adjacent the walls thereof to form a mixture with the products of combustion, and means for uniting the said mixture within the nozzle.

9. A combustion device comprising means disposed within the exhaust conduit of a furnace for introducing air therein in opposition to the draft, said means having passageways through which the products of combustion are admitted to commingle with the air therein, and means surrounding the first mentioned means and in spaced relation thereto and to the walls of the conduit for deflecting the products of combustion downward and adjacent the walls, and means for admitting air to the space between the walls of the conduit and said deflecting means.

10. A combustion device comprising a chamber forming an enlarged interposed portion of the exhaust conduits of a furnace, means disposed therein for introducing air, said means having passages for the induction of the products of combustion to the air therein, means disposed in spaced relation between the first named means and the walls of said chamber to deflect the products of combustion downward and adjacent the walls, and means for admitting air to said chamber adjacent the walls thereof.

11. A combustion device comprising a chamber forming an enlarged interposed portion of the exhaust conduit of a furnace, a chamber surrounding said enlarged portion, means connecting said enlarged portion with the exhaust conduit at a point intermediate the same and the furnace for conducting the products of combustion to said portion, a mixing nozzle within said enlarged portion adapted to direct a current of the products of combustion mixed with air into said conduit in an opposite direction to the outward draft thereof, and air ducts arranged within said surrounding chamber having communication with the outer air and with the nozzle whereby heated air is supplied thereto.

12. A combustion device comprising a chamber forming an enlarged interposed portion of the exhaust conduit of a furnace, a chamber surrounding a part of said enlarged portion and being in open relation to the exhaust conduit on the furnace side thereof and with the said enlarged portion to conduct products of combustion from the conduit to said portion, a mixing nozzle within said enlarged portion of the conduit, a chamber surrounding a portion of the enlarged part of the conduit to form a heated air space having communication with the nozzle and heated air ducts within the surrounding chamber forming the passage for products of combustion, said ducts being in communication with the said heating chamber and the outer air.

13. A combustion device comprising a chamber forming an enlarged interposed portion of the exhaust conduit of a furnace, a chamber surrounding a part of said enlarged portion and being in open relation to the exhaust conduit on the furnace side thereof and with the said enlarged portion to conduct the products of combustion from the conduit to said portion, a mixing nozzle within said enlarged portion of the conduit, heated air ducts within the said surrounding chamber, a baffle within said chamber for directing the products of combustion back and forth between said ducts in its passage from the conduit to the enlarged portion thereof, said ducts having communication with the nozzle for the delivery thereto of highly heated air.

14. A combustion device comprising a chamber forming an enlarged interposed portion of the exhaust conduit of a furnace, a chamber surrounding a part of said enlarged portion and being in open relation to the exhaust conduit on the furnace side thereof and with said enlarged portion to conduct products of combustion from the conduit to said portion, a mixing nozzle within said enlarged portion of the conduit, and heated air ducts within the said surrounding chamber disposed within the path of the products passing therethrough, the said ducts having communication with the nozzle and with the interior of said enlarged chamber.

15. A combustion device comprising a chamber forming an enlarged interposed portion of the exhaust conduit of a furnace, a chamber surrounding a part of said enlarged portion and being in open relation to the exhaust conduit on the furnace side thereof and with said enlarged portion to conduct products of combustion from the conduit to said portion, a mixing nozzle within said enlarged portion of the conduit, and heated air ducts within the said surrounding chamber disposed within the path of the products passing therethrough, the said ducts having communication with the nozzle and with the interior of said enlarged chamber, said communication having means for controlling the admission of heated air.

In testimony whereof I affix my signature.

WILLIAM G. GRIFFIN.